Nov. 24, 1931.   C. NEIMEYER ET AL   1,833,225
TIRE
Filed May 3, 1926
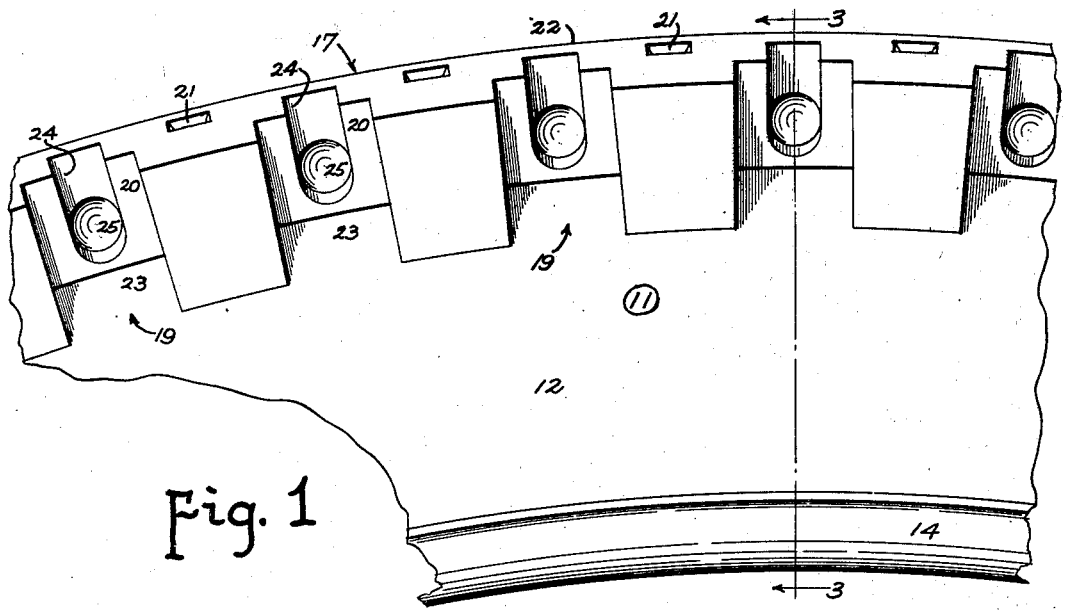
Fig. 1
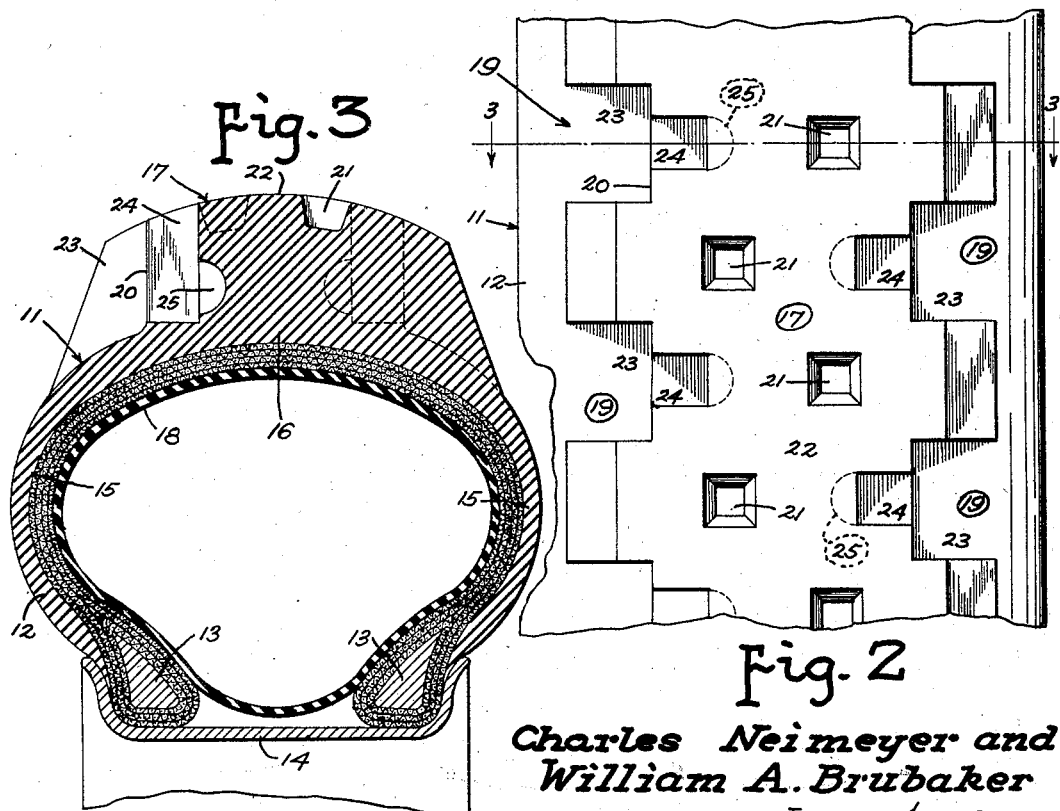
Fig. 3
Fig. 2
Charles Neimeyer and
William A. Brubaker
Inventors
by Smith and Freeman
Attorneys Patented Nov. 24, 1931

1,833,225

UNITED STATES PATENT OFFICE

CHARLES NEIMEYER AND WILLIAM A. BRUBAKER, OF AKRON, OHIO, ASSIGNORS TO HADLEY F. FREEMAN, OF LAKEWOOD, OHIO

TIRE

Application filed May 3, 1926. Serial No. 106,255.

Our invention relates to pneumatic tires and the principal object of our invention is to provide a new and improved tire of this type. In the drawings accompanying this specification and forming a part of this application we have shown, for purposes of illustration, one form which our invention may assume. In these drawings:

Figure 1 is a fragmentary side elevation of this illustrative embodiment of our invention.

Figure 2 is a fragmentary plan view of the tire shown in Figure 1, while

Figure 3 is a section on the line 3—3 of Figures 1 and 2.

The embodiment of our invention herein shown and described provides a tire of substantially the same cross-section as the usual high pressure tire but capable of being operated on materially reduced pressure, possessing the easy riding qualities of a balloon tire, yielding greater mileage than either the usual high pressure tire or the usual balloon tire, and withal substantially puncture-proof.

The embodiment of our invention herein shown and described comprises a pneumatic tire 11 consisting of a carcass 12 comprising the bead portions 13 arranged to be received upon a rim 14, the side wall portions 15 surmounting the bead portions 13, and the tread portion 16 connecting the two side wall portions 15, the side wall portions 15 being bowed outwardly materially and the tread portion 16 being correspondingly flattened, all to produce a tire having a materially flattened cross-section.

Surmounting this carcass 12 is a tread 17 formed of sufficient thickness to substantially prevent cross-bending in the tread 17 upon the imposition of road thrust, and of a width very materially less than the distance between the side walls 15, whereby upon imposition of road thrust the tread 17 is depressed substantially uniformly over its entire width against a support consisting almost entirely of the air within the inner tube 18 and with the side wall portions 15 of the carcass 12 receiving practically no thrust from the tread 17 and acting substantially only as flexible connections between the bead portions 13 and the tread portion 16 to retain the inner tube 18 against escape.

Under these circumstances we find that we may utilize within the inner tube 18 a pressure far lower than that used with the usual high pressure tire, and in fact comparable to that used in the usual balloon tire, and thus secure the easy riding qualities of the balloon tire, but all without increasing the cross-section of the carcass.

At the same time we also find that the thickened tread renders the tire substantially puncture-proof.

On the other hand, in order to further increase the riding qualities of this tire 11, and at the same time prevent the formation of traction wave in the tread 17, we provide in the tread 17 two series of apertures 19 one extending inwardly from each lateral face 20 of the tread 17 with the apertures 19 extending inwardly from one lateral face 20 of the tread 17 staggered relative to the apertures 19 extending inwardly from the other lateral face 20 of the tread 17. In addition, we also provide two series of depressions 21 one on each side of the outer face 22 of the tread 17 and each staggered relative to the apertures 19 extending inwardly on that side of the tread 17.

From experience we prefer to form each of these apertures 19 comprising first a wide outer portion 23 extending from the outer face 22 of the tread 17 substantially to the junction of the tread 17 with the tread portion 16 of the carcass 12, second a continuation 24 reduced in width but of the same height as the first wide portion 23, and third a further continuation 25 substantially semi-spherical in shape, of a diameter substantially equal to the width of the reduced portion 24, and extending into the tread 17 from the lower end of the reduced portion 24; and we prefer to form the depressions 21 as inverted frustrated quadrilateral pyramids having a base substantially equal to the diameter of the semi-spherical continuations 25 and a height substantially half the distance from the outer face 22 of the tread 17 to the outer extremity of a semi-spherical continuation 25.

In addition to this, and in order to guard against any tendency of the tread 17 to become displaced laterally, we also prefer to provide an additional connection between the tread 17 and the carcass 12 consisting of two series of abutments 26 one on each side of the tire 11 and extending to the tread portion 16 of the carcass 12 from those portions of that lateral face 20 of the tread 17 remaining between the series of apertures 19 extending inwardly therefrom.

From the above description, taken in connection with the accompanying drawings, there will be obvious to those skilled in the art the construction of the form of our invention herein shown, the advantages thereof, and the means by which these advantages are secured. At the same time, it will also be obvious to those skilled in the art that the particular embodiment of our invention herein shown may be variously changed and modified without sacrificing these advantages or departing from the scope of our invention. It will therefore be understood that the disclosure herein is illustrative only and that our invention is not limited thereto.

We claim:

1. Pneumatic tires having a carcass with thickened tread, said tread having transverse openings, the entrances to which lie to either side of the mid-plane of the tire, said tread having side walls and being provided with recesses or notches at the junction of the tread face and side walls, said recesses or notches being of greater width than the diameter of said openings, said openings beginning at the inner surfaces of the recesses or notches and extending toward the opposite side of the tread.

2. In pneumatic tires, a carcass having a thickened tread, said tread having openings entering from its sides and being provided with recesses or notches aligning with the outer ends of said openings, thereby leaving lugs at either side of each opening to guard the entrances to said openings.

3. A pneumatic tire casing comprising: a carcass provided with bead portions to be received upon a rim, side portions surmounting said bead portions and bowed outwardly materially to cause said carcass to be materially flattened, and a flattened tread portion connecting said sidewall portions; and a tread mounted upon said tread portion of said carcass, of a width sufficiently less than the distance between said sidewall portions to cause the road thrust on said tread to be imposed substantially entirely upon the air within said carcass and in no substantial part as a thrust upon said sidewall portions, thickened to prevent substantial cross-bending of said tread and cause said tread to depress upon road thrust substantially uniformly across the width of said tread, and provided on each lateral face of said tread with a series of apertures extending laterally into said tread.

4. A pneumatic tire casing comprising: a cascass provided with bead portions to be received upon a rim, side portions surmounting said bead portions and bowed outwardly materially to cause said carcass to be materially flattened, and a flattened tread portion connecting said sidewall portions; and a tread mounted upon said tread portion of said carcass, of a width sufficiently less than the distance between said sidewall portions to cause the road thrust on said tread to be imposed substantially entirely upon the air within said carcass and in no substantial part as a thrust upon said sidewall portions, thickened to prevent substantial cross-bending of said tread and cause said tread to depress upon road thrust substantially uniformly across the width of said tread, and provided on each lateral face of said tread with a series of apertures extending laterally into said tread and opening through the outer face of said tread for a first distance and then continuing below said outer face for a further distance.

5. A pneumatic tire casing comprising: a carcass provided with bead portions to be received upon a rim, side portions surmounting said bead portions and bowed outwardly materially to cause said carcass to be materially flattened, and a flattened tread portion connecting said sidewall portions; and a tread mounted upon said tread portion of said carcass, of a width sufficiently less than the distance between said sidewall portions to cause the road thrust on said tread to be imposed substantially entirely upon the air within said carcass and in no substantial part as a thrust upon said sidewall portions, thickened to prevent substantial cross-bending of said tread and to cause said tread to depress upon road thrust substantially uniformly across the width of said tread, and provided on each lateral face of said tread with a series of apertures each extending laterally into said tread from a surface displaced from said lateral face.

6. A pneumatic tire casing comprising: a carcass provided with bead portions to be received upon a rim, side portions surmounting said bead portions and bowed outwardly materially to cause said carcass to be materially flattened, and a flattened tread portion connecting said sidewall portions; and a tread mounted upon said tread portion of said carcass, of a width sufficiently less than the distance between said sidewall portions to cause the road thrust on said tread to be imposed substantially entirely upon the air within said carcass and in no substantial part as a thrust upon said sidewall portions, thickened to prevent substantial cross-bending of said tread and cause said tread to depress upon road thrust substantially uniformly across the width of said tread, provided on each lateral face of said tread with a series of apertures extending laterally into said tread and opening through the outer face of said tread for a first distance and then continuing below said outer face for a further distance, and with each of said apertures extending into said tread from a surface displaced from the corresponding said lateral face.

7. A pneumatic tire tread of such increased thickness as would produce undue heating and undue circumferential strain, provided with apertures extending into said tread from the two lateral faces thereof and each opening through the outer face of said tread for a first distance and then continuing below said outer face for a further distance, said apertures being effective to prevent undue heating and undue circumferential strain, and leaving a tread body effective to prevent undue flexing, and to prevent disruption of said tread either from circumferential strain or from flexing.

8. A pneumatic tire tread of such increased thickness as would produce undue heating and undue circumferential strain, provided with apertures extending into said tread from the two lateral faces thereof and each having a reduction in area intermediately, said apertures being effective to prevent undue heating and undue circumferential strain, and leaving a tread body effective to prevent undue flexing, and to prevent disruption of said tread either from circumferential strain or from flexing.

9. A pneumatic tire tread of such increased thickness as would produce undue heating and undue circumferential strain, provided with apertures extending into said tread from the two lateral faces thereof, each opening through the outer face of said tread for a first distance and then continuing below said outer face for a further distance, and each having a reduction in area intermediate said first distance, said apertures being effective to prevent undue heating and undue circumferential strain, and leaving a tread body effective to prevent undue flexing, and to prevent disruption of said tread either from circumferential strain or from flexing.

10. A pneumatic tire casing comprising: a carcass provided with bead portions to be received upon a rim, side portions surmounting said bead portions, and a tread portion connecting said side wall portions; and a tread mounted upon said tread portion of said carcass, thickened, and provided on each lateral face of said tread with a series of apertures extending laterally into said tread and opening through the outer face of said tread for a first distance and then continuing below said outer face for a further distance.

11. A pneumatic tire casing comprising: a carcass provided with bead portions to be received upon a rim, side portions surmounting said bead portions, and a tread portion connecting said sidewall portions; and a tread mounted upon said tread portion of said carcass, thickened, and provided on each lateral face of said tread with a series of apertures each extending laterally into said tread from a surface displaced from said lateral face.

12. A pneumatic tire casing comprising: a carcass provided with bead portions to be received upon a rim, side portions surmounting said bead portions, and a tread portion connecting said sidewall portions; and a tread mounted upon said tread portion of said carcass, thickened, provided on each lateral face of said tread with a series of apertures extending laterally into said tread and opening through the outer face of said tread for a first distance and then continuing below said outer face for a further distance, and with each of said apertures extending into said tread from a surface displaced from the corresponding said lateral face.

In testimony whereof, we hereunto affix our signatures.

CHAS. NEIMEYER.
WILLIAM A. BRUBAKER.